US007005614B2

(12) United States Patent
Lee

(10) Patent No.: US 7,005,614 B2
(45) Date of Patent: Feb. 28, 2006

(54) COOKING APPARATUS EQUIPPED WITH HEATERS AND METHOD OF CONTROLLING THE SAME

(75) Inventor: Won-Woo Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 561 days.

(21) Appl. No.: 10/350,085

(22) Filed: Jan. 24, 2003

(65) Prior Publication Data

US 2004/0040447 A1 Mar. 4, 2004

(30) Foreign Application Priority Data

Sep. 2, 2002 (KR) .............................. 2002-52598

(51) Int. Cl.
*A21B 1/40* (2006.01)
*F24C 7/04* (2006.01)
*F24C 7/08* (2006.01)

(52) U.S. Cl. ...................... 219/413; 219/392; 219/486; 219/494; 219/497; 99/331

(58) Field of Classification Search ..................... None
See application file for complete search history.

(56) References Cited

U.S. PATENT DOCUMENTS 4,254,325 A * 3/1981 Snyder ....................... 219/413
6,727,478 B1 * 4/2004 Rael et al. .............. 126/337 R
6,734,403 B1 * 5/2004 Baker et al. ................ 218/486
6,815,644 B1 * 11/2004 Muegge et al. ............. 219/413

FOREIGN PATENT DOCUMENTS

KR 1988-057988 9/1998
KR 1998-051453 9/1998

* cited by examiner

*Primary Examiner*—Joseph Pelham
(74) *Attorney, Agent, or Firm*—Staas & Halsey LLP

(57) ABSTRACT

A cooking apparatus equipped with heaters and a method of controlling the same. An aspect of the present invention is to increase convenience of a user by identifying a kind of an accessory, such as a wire rack, a crumb tray or the like, present in a cooking cavity based on a variation in an inner temperature of a cooking cavity at an initial operating stage of a cooking mode using the heaters and automatically performing the ON/OFF control mode of the heaters suitable for a corresponding accessory. A cooking apparatus is provided including two or more heaters installed in a first position of a cooking cavity heating food, the crumb tray is inserted in a second position of the cooking cavity and is used to contain the food in cooking modes using the heaters, and a temperature detection unit is installed between the first and second positions to detect an inside temperature of the cooking cavity. When a temperature variation rate of the cooking cavity detected by the temperature detection unit is greater than a preset value, the crumb tray is determined to be used as a cooking accessory, so an ON/OFF state of the heaters is controlled to be suitable for the cooking mode using the crumb tray.

32 Claims, 9 Drawing Sheets

COOKING APPARATUS EQUIPPED WITH HEATERS AND METHOD OF CONTROLLING THE SAME

CROSS-REFERENCE TO RELATED APPLICATIONS

This application claims the benefit of Korean Application No. 2002-52598, filed Sep. 2, 2002, in the Korean Intellectual Property Office, the disclosure of which is incorporated herein by reference.

BACKGROUND OF THE INVENTION

1. Field of the Invention

The present invention relates generally to a cooking apparatus equipped with heaters and a method of controlling the same, and more particularly, to a cooking apparatus equipped with heaters and a method of controlling the same, which carries out baking and broiling or grilling.

2. Description of the Related Art

In general, an electric oven or a gas oven is used to bake bread, cookies or the like, or to broil or grill meat, fish or the like. In contrast, a general microwave oven heats food using electromagnetic waves generated by a magnetron. When a heater is additionally installed in the general microwave oven, various kinds of cooking, such as baking, broiling or grilling can be performed using the general microwave oven.

SUMMARY OF THE INVENTION

Accordingly, it is an aspect of the present invention to provide a cooking apparatus equipped with heaters and method of controlling the cooking apparatus equipped with heaters, which increases convenience to a user by identifying a kind of an accessory, such as a wire rack, a crumb tray or the like, present in a cooking cavity based on a variation in an inner temperature of a cooking cavity at an initial operating stage of a cooking mode using heaters and automatically performing a ON/OFF control mode of the heaters suitable for a corresponding accessory.

Additional aspects and advantages of the invention will be set forth in part in the description which follows and, in part, will be obvious from the description, or may be learned by practice of the invention.

The above and other aspects are achieved by providing a cooking apparatus including two or more heater installed in a first position of a cooking cavity to heat food, a crumb tray inserted in a second position of the cooking cavity and used to contain the food during cooking modes using the heaters, and a temperature detection unit installed between the first and second positions to detect an inside temperature of the cooking cavity. When a temperature variation rate of the cooking cavity detected by the temperature detection unit is greater than a preset value, the crumb tray is determined to be used as a cooking accessory, so an ON/OFF state of the heaters is controlled to be suitable for the cooking mode using the crumb tray.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
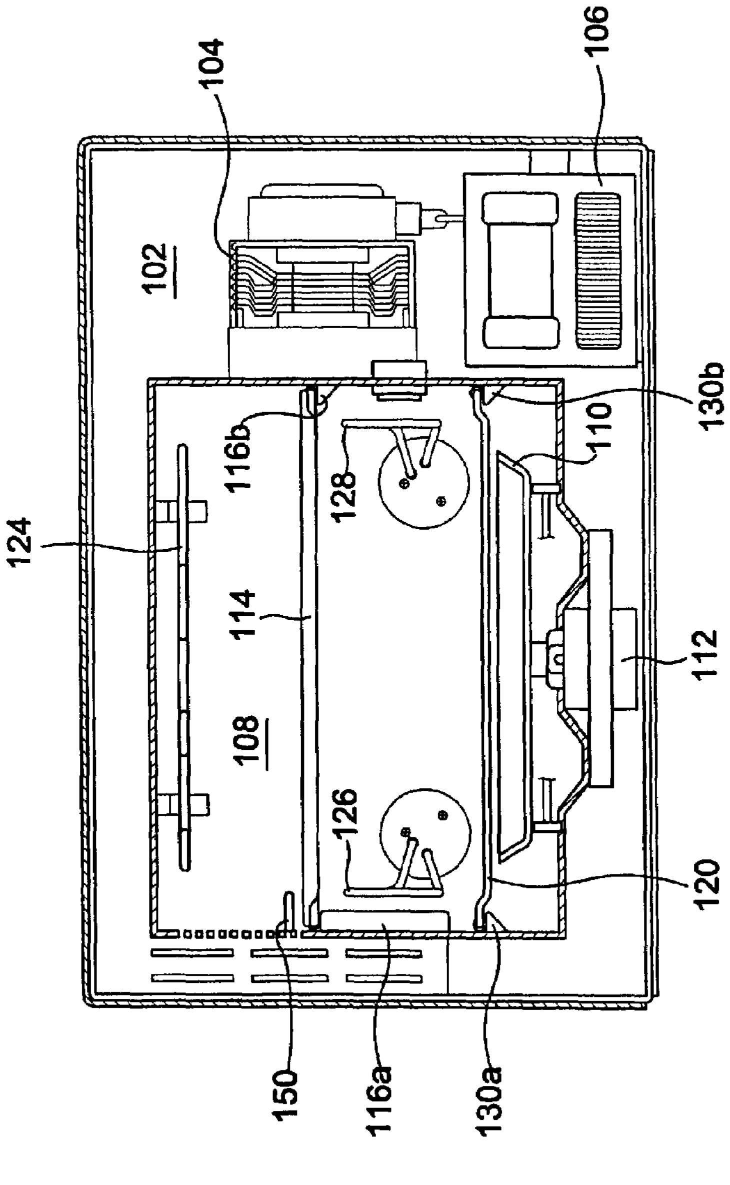
FIG. 1 is a partially sectional view of a related microwave oven equipped with heaters.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a partially sectional view of a related microwave oven equipped with heaters. As shown in FIG. 1, the microwave oven is provided with a machine chamber 102 and a cooking cavity 108. The machine chamber 102 is provided with a magnetron 104, and electromagnetic waves (i.e., microwaves) are generated by the magnetron 104. The magnetron 104 is supplied with high voltage power through a power source unit 106.

Figure 2A:
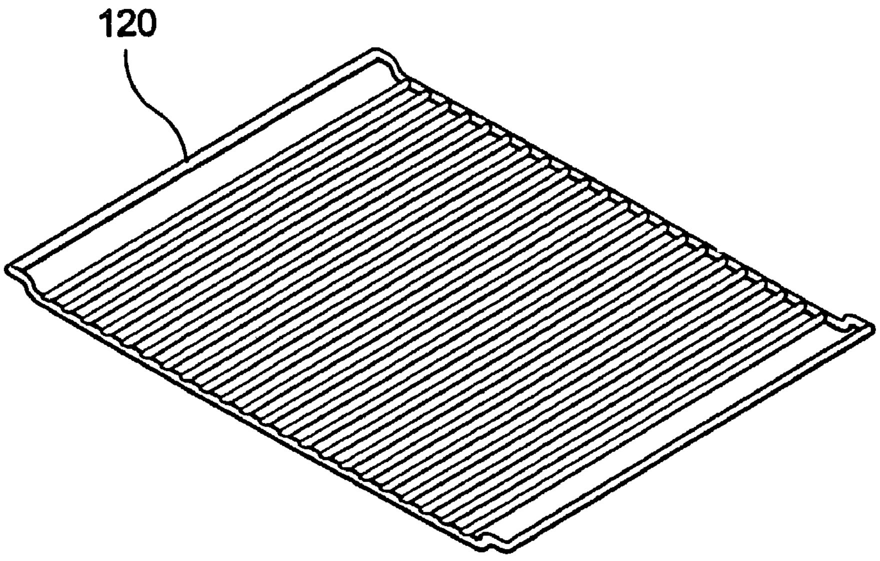
FIG. 2 is a view of a wire rack and a crumb tray of FIG. 1.
Figure 2B:
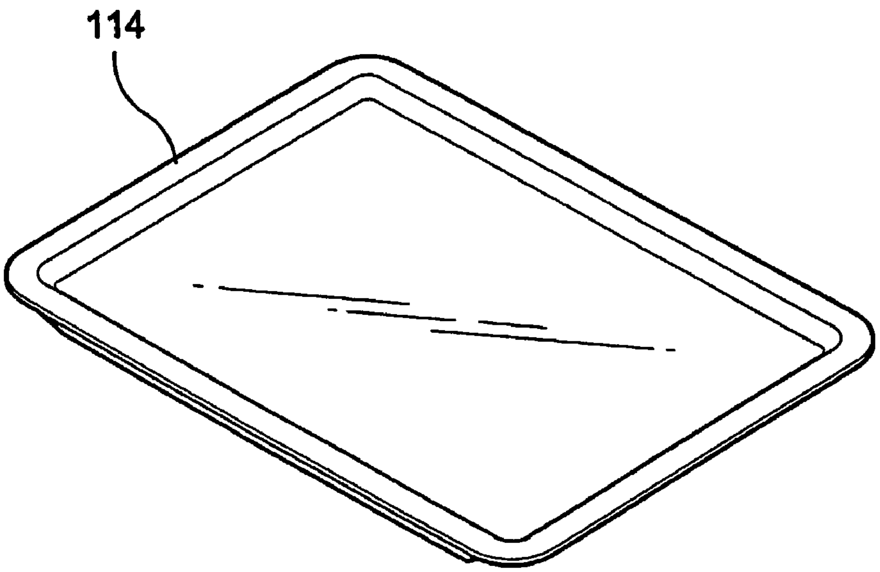

A glass tray 110 is mounted on a bottom of the cooking cavity 108 to be rotated by a motor 112. The glass tray 110 is used to cook the food using microwaves generated by the magnetron 104. An upper heater 124 and two lower heaters 126 and 128 are installed in the cooking cavity 108. The upper heater 124 is fixedly mounted on a ceiling of the cooking cavity 108 to heat the food. The two lower heaters 126 and 128 are respectively mounted on two side portions of a rear wall of the cooking cavity 108 through rotating members **126*a* and 128*a* to heat the food. A crumb tray 114 used to bake bread, cookies and the like is inserted between the upper heater 124 and the two lower heaters 126 and 128, and is placed on crumb tray supports 116*a* and 116*b*. A temperature sensor 150 that detects an inside temperature of the cooking cavity 108 is installed above one of the crumb tray supports 116*a*. A wire rack 120 used to broil meat, fish or the like is inserted under the two lower heaters 126 and 128, and is placed on wire rack supports 130*a* and 130*b*. The wire rack 120 and the crumb tray 114** used in the related microwave oven equipped with heaters are illustrated in FIGS. 2A and 2B, respectively.

Figure 3:
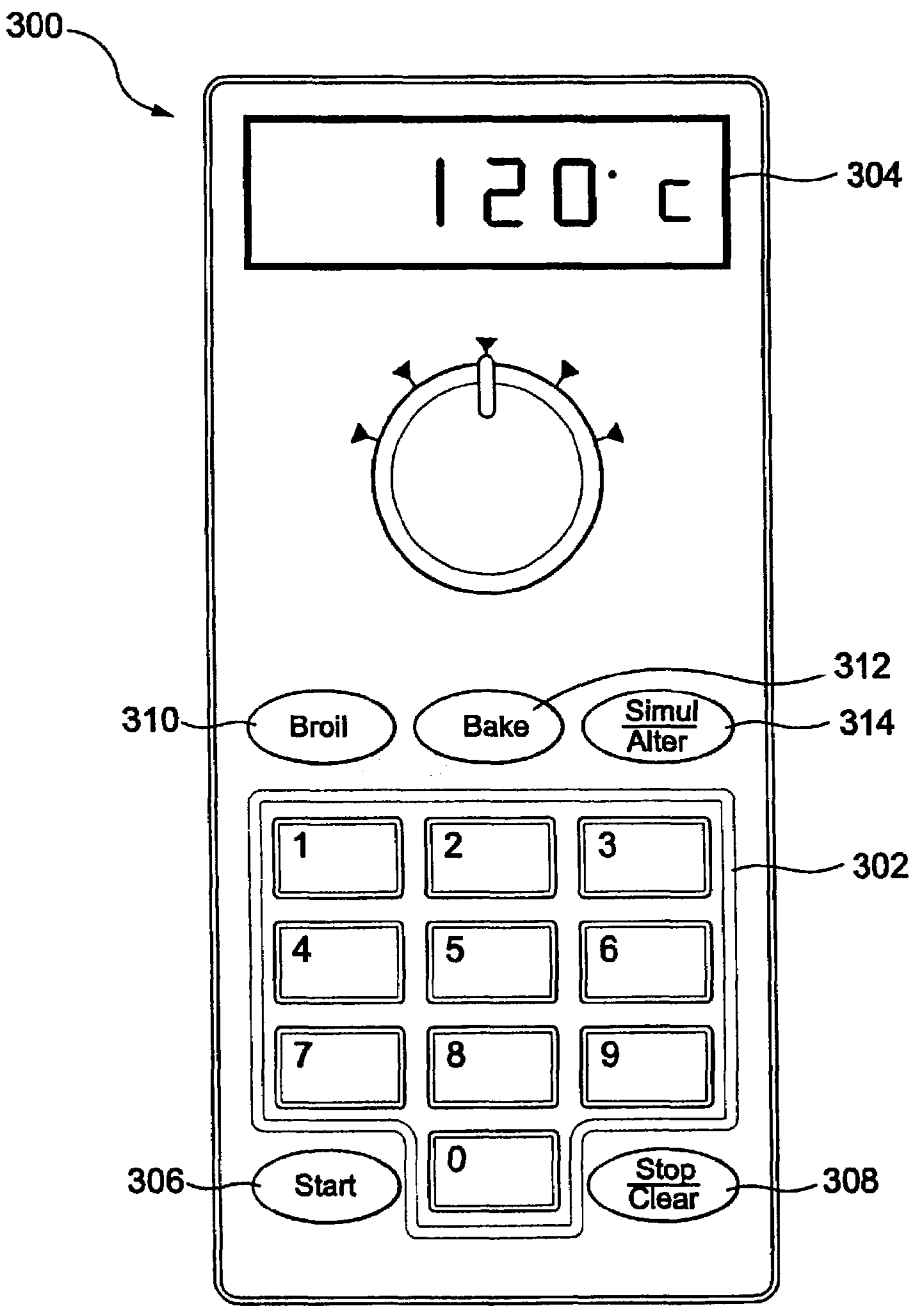
FIG. 3 illustrates a view of a control panel of the related microwave oven.

FIG. 3 illustrates a control panel of the related microwave oven equipped with heaters. As shown in FIG. 3, the control panel 300 is provided with a matrix type numeric pad 302 that has number buttons 0 to 9, a start button 306 and a stop button 308. A value set through the matrix type numeric pad 302 is displayed in a display unit 304. The control panel 300 is provided with a broil selection button 310 and a bake selection button 312, so a user can select a broiling mode or a baking mode. A Simul/Alter selection button 314 is used to allow the user to select an ON/OFF control mode of the heaters 124, 126 and 128. The "Simul" performs control such that the upper heater 124 and the lower heaters 126 and 128 are simultaneously switched ON or OFF, while the "Alter" performs control such that the upper heater 124 and the two lower heaters 126 and 128 are alternately switched ON or OFF.

To bake bread, cookies or the like, if the user puts the food on the crumb tray 114, places the crumb tray 114 on the crumb tray supports 116*a* and 116*b* and pushes the bake selection button 312, the food placed on the crumb tray 114 is heated by the upper heater 124 and the lower heaters 126 and 128. In contrast, to broil meat, fish or the like, if the user puts the food on the wire rack 120, places the wire rack 120 on the wire rack supports 130*a* and 130*b* and pushes the broil selection button 310, the food placed on the wire rack 120 is heated by the upper heater 124 and the two lower heaters 126 and 128. If a cooking mode such as a baking mode or a broiling mode is initiated, the upper heater 124 and the two lower heaters 126 and 128 are all operated, so food is heated. If the inside temperature of the cooking cavity 108 rises and reaches a preset temperature, the upper heater 124 and the lower heaters 126 and 128 are controlled by the ON/OFF control mode, so the inside temperature of the cooking cavity 108 is maintained at the preset temperature.

Figure 4:
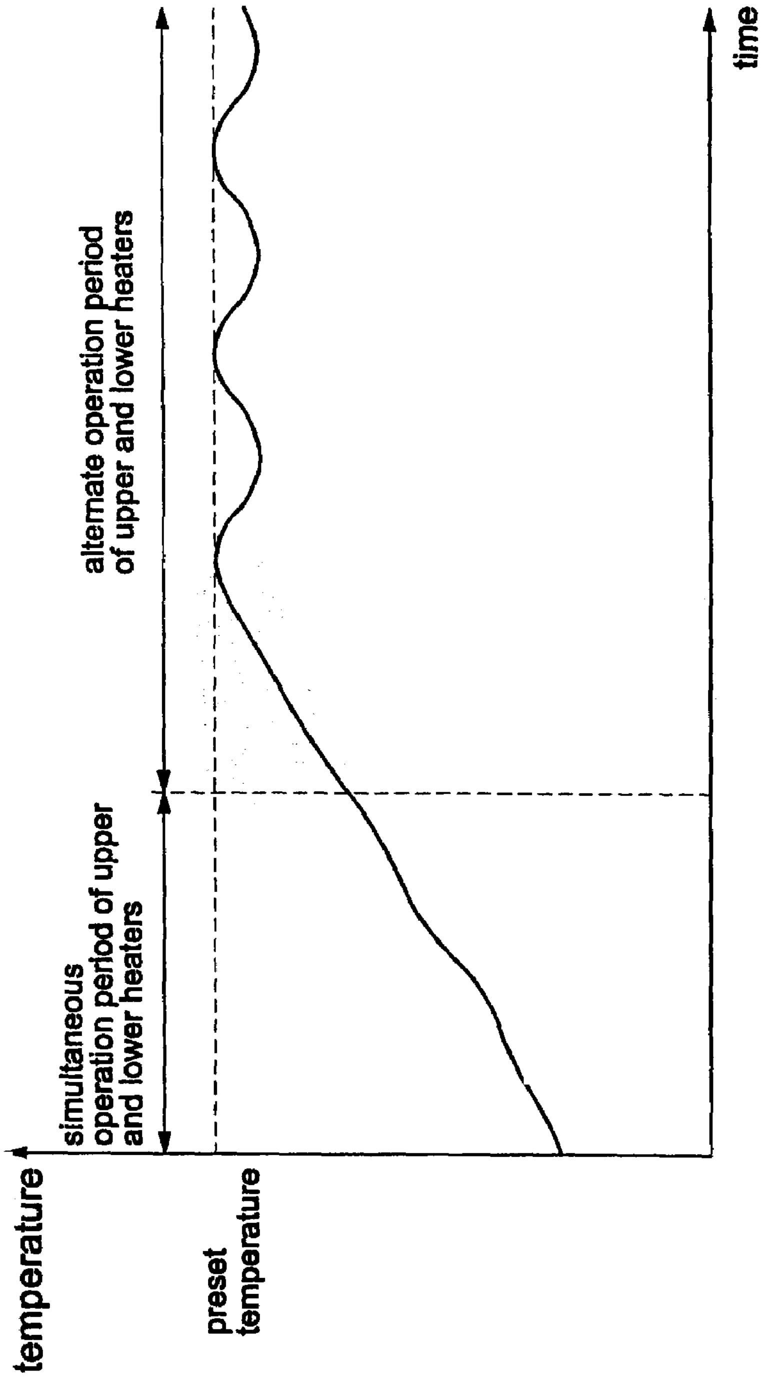
FIG. 4 is a graph illustrating inside temperature characteristics of a cooking cavity of the related microwave oven.

FIG. 4 is a graph illustrating inside temperature characteristics of the cooking cavity of the related microwave oven equipped with heaters. As shown in FIG. 4, if the cooking mode is initiated using the heaters, the upper heater 124 and the two lower heaters 126 and 128 are simultaneously operated, so the inside temperature of the cooking cavity 108 rapidly rises. If the inside temperature of the cooking cavity 108 reaches a certain temperature, the upper heater 124 and the two lower heaters 126 and 128 are alternately operated, so the inside temperature of the cooking cavity 108 is maintained at the preset temperature.

As described above, the ON/OFF control modes of the upper heater 124 and the two lower heaters 126 and 128 used in the related microwave oven include a method that controls the upper heater 124 and the two lower heaters 126 and 128 to be simultaneously switched ON or OFF and a method that controls the upper heater 124 and the two lower heaters 126 and 128 to be alternately switched ON and OFF. The ON/OFF control modes of the upper heater 124 and the two lower heaters 126 and 128 may further include a method that combines the two methods together. For the related microwave oven equipped with heaters, instructions for use of accessories, such as a wire rack and a crumb tray, and the ON/OFF control modes of the heaters used according to a kind of food, are provided through a user's manual. Accordingly, in order to desirably cook the food, the user has to know how to select an appropriate accessory and an appropriate ON/OFF control mode of the heaters according to the kind of the food.

Hereinafter, a construction of a microwave oven equipped with heaters in accordance with an embodiment of the present invention with reference to FIGS. 5 to 8 is described.

Figure 5:
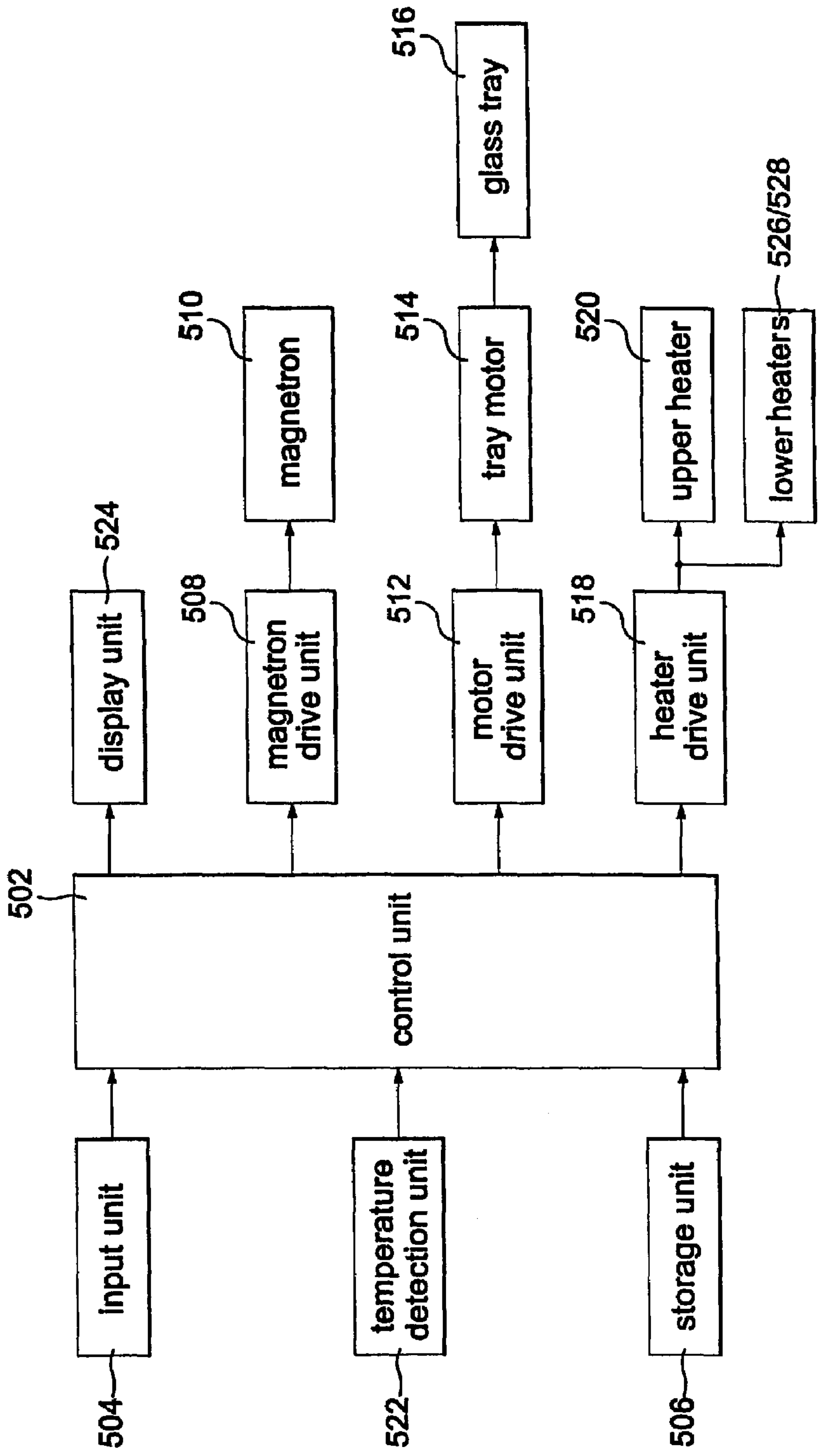
FIG. 5 is a block diagram illustrating a construction of a microwave oven equipped with heaters in accordance with an embodiment of the present invention.
Figure 7:
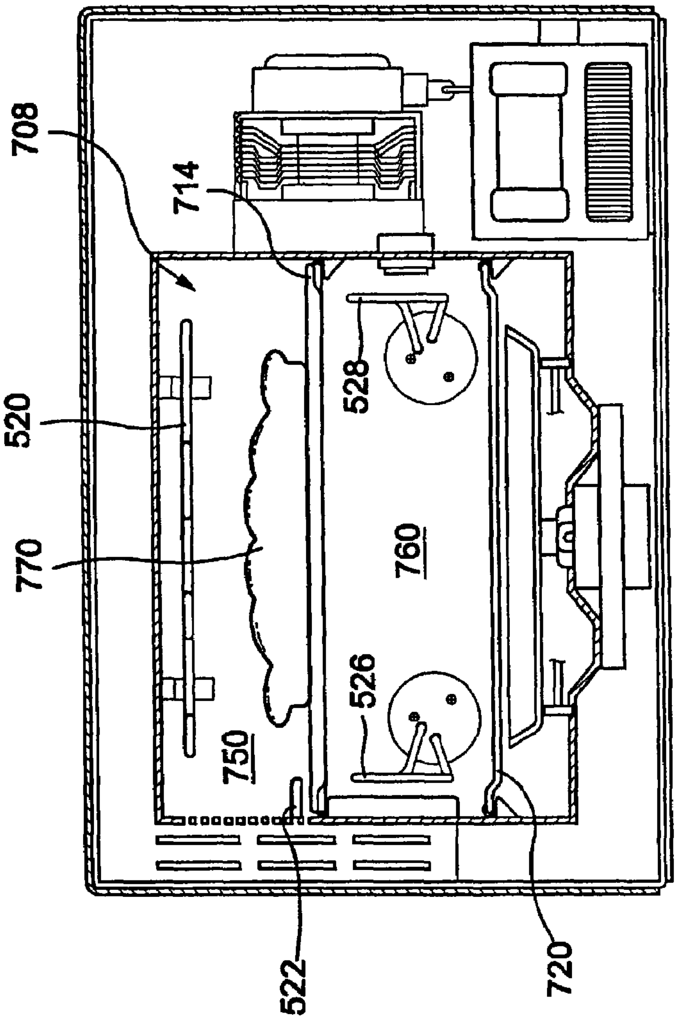
FIG. 7 is a sectional view illustrating a heat conduction process according to kinds of accessories in the microwave oven of FIG. 5.

FIG. 5 is a block diagram illustrating a construction of the microwave oven equipped with heaters in accordance with an embodiment of the present invention. As shown in FIG. 5, a control unit 502 controls an overall operation of the microwave oven, and is connected at input terminals thereof to an input unit 504, a temperature detection unit 522 and a storage unit 506. The input unit 504 is provided with one or more cooking mode selection buttons, number buttons or the like to set a cooking mode, a cooking time or the like. The temperature detection unit 522 detects an inside temperature of a cooking cavity 708, as shown in FIG. 7, and provides the detected temperature to the control unit 502. The storage unit 506 stores data required to cook the foods, such as cooking times according to the kinds of the foods, ON/OFF control modes of an upper heater 520 and lower heaters 526 and 528 or the like.

The control unit 502 is connected at output terminals thereof to a magnetron drive unit 508, a motor drive unit 512 and a heater drive unit 518. The magnetron drive unit 508 drives a magnetron 510 to generate electromagnetic waves. The motor drive unit 512 drives a tray motor 514 so that a glass tray 516 positioned in the cooking cavity 708 is rotated. The heater drive unit 518 drives the upper heater 520 and the lower heaters 526 and 528.

Figure 6:
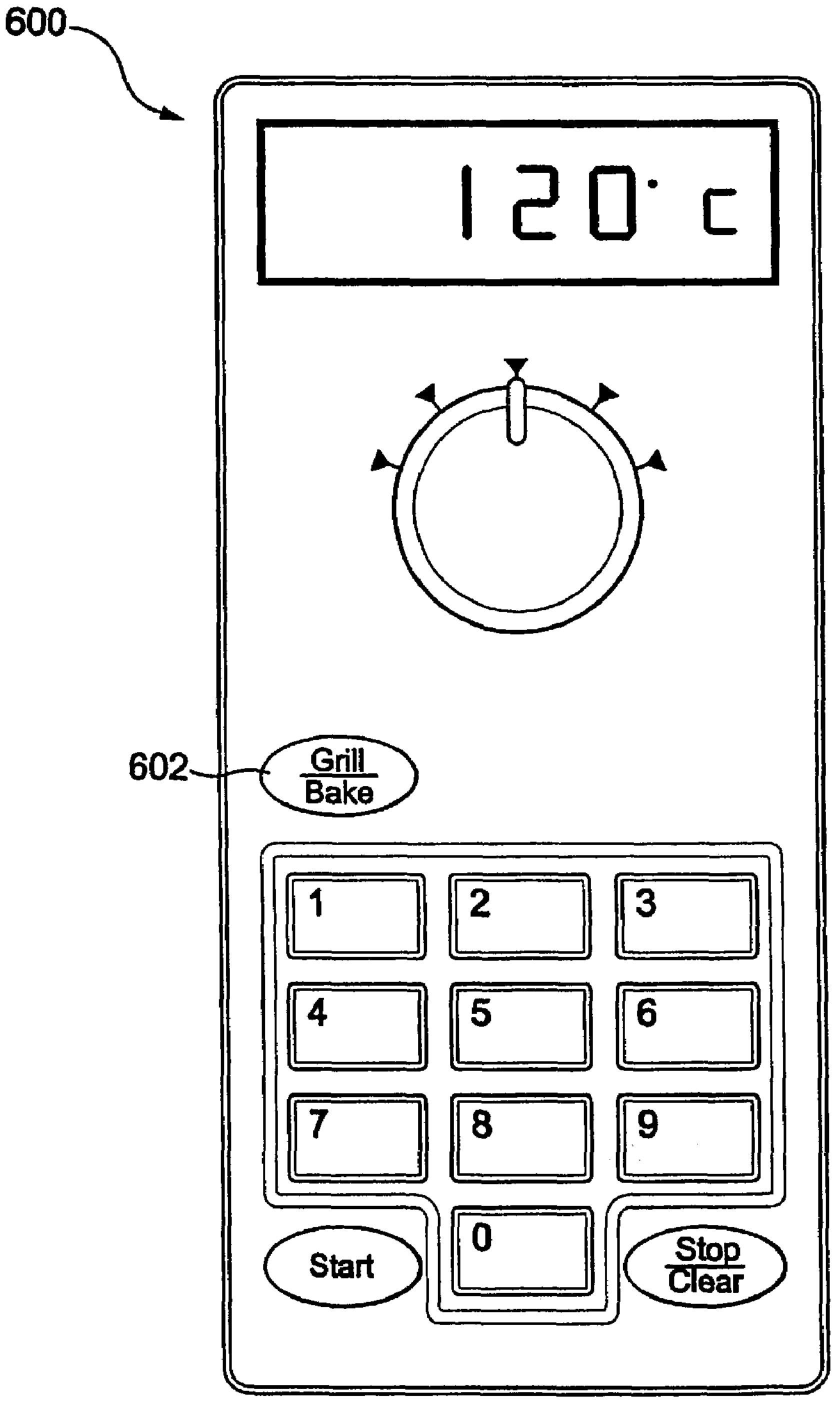
FIG. 6 illustrates the control panel of the microwave oven of FIG. 5.

FIG. 6 illustrates a control panel 600 of the microwave oven equipped with heaters of FIG. 5. As shown in FIG. 6, one of the cooking modes, such as a baking mode or a broiling mode, can be selected using only a single cooking mode selection button 602 so as to cook the food using the upper heater 520 and the lower heaters 526 and 528, and the ON/OFF control mode of the upper heater 520 and the lower heaters 526 and 528, which is suitable for the selected cooking mode, is automatically performed. In the microwave oven equipped with heaters, the ON/OFF control mode of the upper heater 520 and the lower heaters 526 and 528, which is suitable for a corresponding accessory, is automatically performed by identifying a kind of accessory, such as a wire rack 720, a crumb tray 714 or the like, present in the cooking cavity 708 based on a variation in an inside temperature of the cooking cavity 708 at an initial operating stage of the selected cooking mode.

The ON/OFF control mode of the upper heater 520 and the lower heaters 526 and 528 is described in detail with reference to FIG. 7. FIG. 7 is a sectional view illustrating a heat conduction process according to the kinds of the accessories in the microwave oven equipped with heaters. As shown in FIG. 7, a crumb tray 714 used to bake bread, cookies and the like is inserted between the upper heater 520 and the lower heaters 526 and 528. If the crumb tray 714 is inserted, as described above, heat generated by the upper heater 520 is not transmitted to a lower space 760, but mainly remains in an upper space 750. Since the temperature detection unit 522 is installed above the crumb tray 714, the temperature detection unit 522 is very sensitive to a variation in the temperature of the upper space 750 of the crumb tray 714. Thus, if an inclination of a temperature characteristic curve of the upper space 750 of the cooking cavity 708 is greater than that without the crumb tray 714 inserted in the cooking cavity 708, it can be appreciated that the baking mode to bake the bread (cookies or the like) 770 using the crumb tray 714 is being performed. If the baking mode is performed as described above, the bread (cookies or the like) 770 rises to come excessively close to the upper heater 520. Accordingly, the bread 770 must be prevented from being overcooked by controlling the upper heater 520 and the lower heaters 526 and 528 to be alternately switched ON and OFF.

Figure 8:
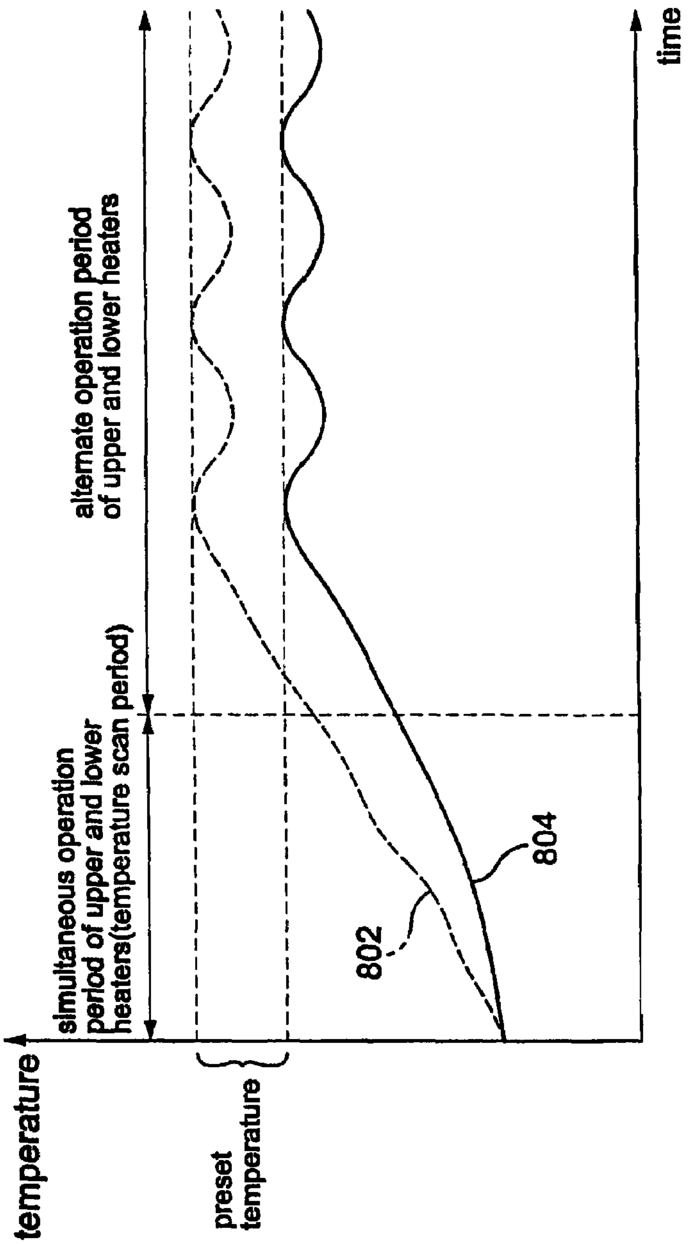
FIG. 8 is a graph illustrating inside a temperature characteristics of a cooking cavity of FIG. 5.

FIG. 8 is a graph illustrating inside temperature characteristics of the cooking cavity 708 of the microwave oven equipped with heaters of FIG. 5. As shown in FIG. 8, since the temperature of the upper space 750 of the cooking cavity 708 rapidly rises in the case of using the crumb tray 714, the inclination of the temperature characteristic curve 802 is greater than an inclination of the temperature characteristic curve 804 in the case of using the wire rack 720. Accordingly, the ON/OFF control mode of the upper heater 520 and the lower heaters 526 and 528 is determined by periodically detecting the temperature of the cooking cavity 708 through the temperature detection unit 522 during a simultaneous operation period of the upper heater 520 and the lower heaters 526 and 528 and obtaining the inclination of the temperature characteristic curve using the detected temperature, and determining whether the crumb tray 714 is used based on the obtained inclination.

Figure 9:
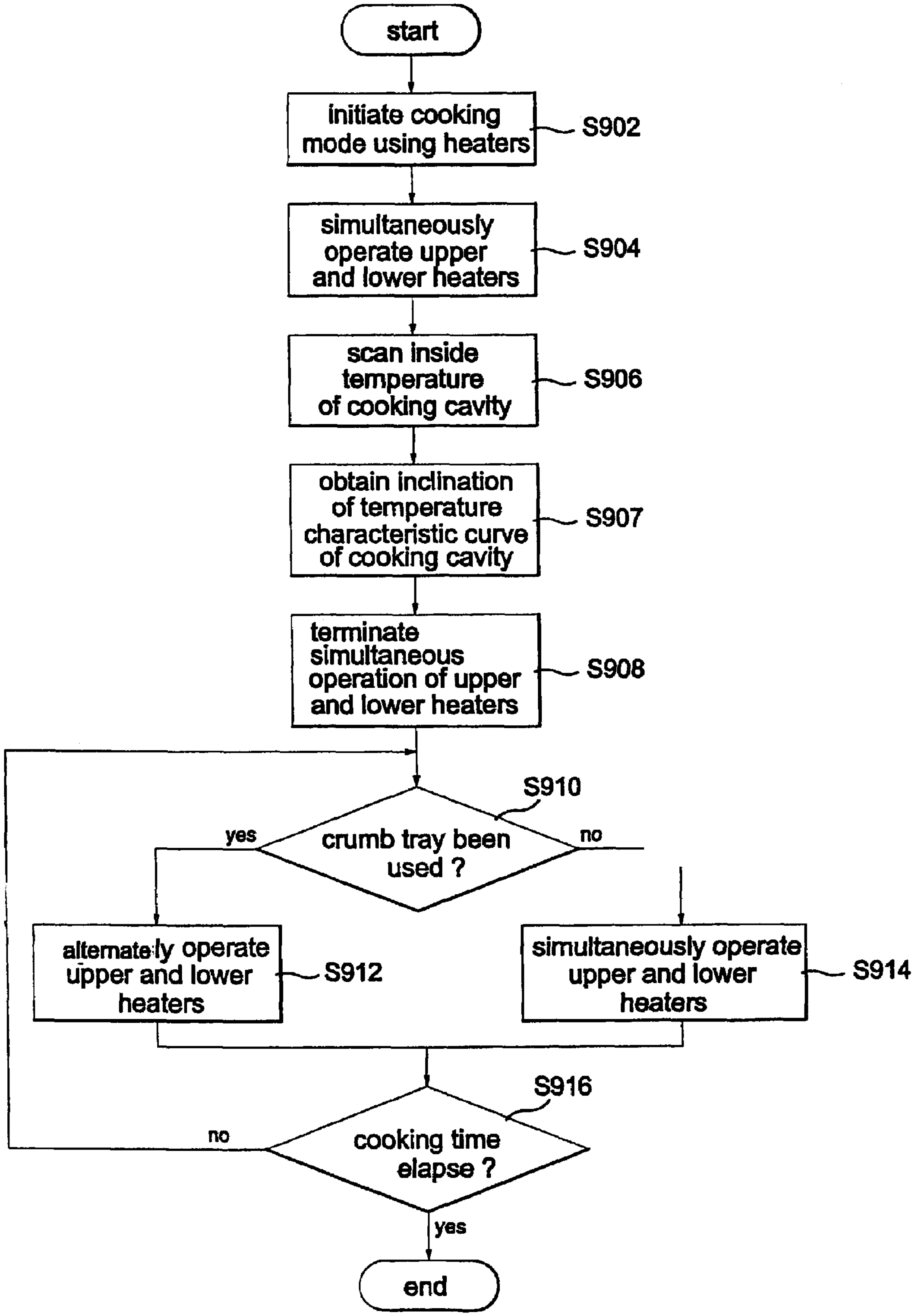
FIG. 9 is a flowchart illustrating a method of controlling the microwave oven of FIG. 5.

FIG. 9 is a flowchart illustrating a method of controlling the microwave oven equipped with heaters of FIG. 5. As shown in FIG. 9, if a cooking mode using the upper heater 520 and the lower heaters 526 and 528 is initiated at operation S902, the upper heater 520 and the lower heaters 526 and 528 are simultaneously operated at operation S904, so the inside of the cooking cavity 708 is heated. The inside temperature of the cooking cavity 708 is scanned during a simultaneous operation period of the upper heater 520 and the lower heaters 526 and 528 at operation S906, so the inclination of the temperature characteristic curve of the inside of the cooking cavity 708 is obtained at operation S907. If the simultaneous operation of the upper heater 520 and the lower heaters 526 and 528 is terminated at operation S908, whether the crumb tray 714 has been used is determined based on the obtained inclination of the temperature characteristic curve at operation S910. If the crumb tray 714 has been used, the food is prevented from being overcooked by controlling the upper heater 520 and the lower heaters 526 and 528 to be alternately switched ON and OFF at operation S912. On the contrary, if the crumb tray 714 has not been used, the upper heater 520 and the lower heaters 526 and 528 are simultaneously switched ON or OFF at operation S914. If cooking is performed by the ON/OFF control mode of the upper heater 520 and the lower heaters 526 and 528 and a cooking time elapses at operation S916, the cooking mode is terminated.

The microwave oven equipped with heaters in accordance with the present invention increases users' convenience by identifying the kind of an accessory, such as a wire rack, a crumb tray or the like, present in a cooking cavity on the basis of a variation in the inner temperature of a cooking cavity at the initial operating stage of a cooking mode using heaters and automatically performing the ON/OFF control mode of the heaters suitable for the corresponding accessory.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cooking apparatus having two or more heaters installed in a first position of a cooking cavity to heat food, and a crumb tray insertable in a second position in the cooking cavity and used to contain the food in cooking modes using the two or more heaters, comprising:

- a temperature detection unit provided between the first and second positions to detect an inside temperature of the cooking cavity; and
- a control unit to determine that the crumb tray is used when a temperature variation rate of the cooking cavity is greater than a preset value.

2. The apparatus as set forth in claim 1, wherein an ON/OFF state of the two or more heaters is controlled for a selected cooking mode using the crumb tray when the crumb tray is determined to be used.

3. The apparatus as set forth in claim 2, wherein the two or more heaters comprise:

- a first heater; and
- a second heater, the first and second heaters being alternately switched ON and OFF when the crumb tray is determined to be used.

4. The apparatus as set forth in claim 3, wherein the first and second heaters are simultaneously switched ON or OFF when the crumb tray is determined not to be used.

5. A cooking apparatus having two or more heaters installed in a cooking cavity to heat food, and a crumb tray insertable in the cooking cavity and used to contain the food in cooking modes using the two or more heaters, comprising:

- a single cooking mode selection button to select one of the cooking modes using the two or more heaters; and
- a control unit to determine that the crumb tray is used when a temperature variation rate of the cooking cavity is greater than a preset value in the cooking mode using the two or more heaters.

6. The apparatus as set forth in claim 5, wherein the cooking modes comprise:

- a baking mode; and
- a broiling mode, the cooking modes being selectable through the single cooking mode selection button.

7. The apparatus as set forth in claim 5, wherein an ON/OFF state of the two or more heaters is controlled for a selected cooking mode using the crumb tray when the crumb tray is determined to be used.

8. A method of controlling a cooking apparatus, the cooking apparatus having first and second heaters installed in first and second positions of a cooking cavity, respectively, to heat food, and a crumb tray inserted between the first and second positions and used to contain the food in cooking modes using the first and second heaters, comprising:

- operating simultaneously the first and second heaters when one of the cooking modes using the first and second heaters is initiated;
- obtaining a temperature variation rate by periodically detecting a temperature of the cooking cavity; and
- determining whether the crumb tray is used based on the temperature variation rate.

9. The method as set forth in claim 8, wherein that the crumb tray is determined to be used when the temperature variation rate is greater than a preset value.

10. The method as set forth in claim 8, further comprising:

- controlling the first and second heaters to be alternately switched ON and OFF when the crumb tray is determined to be used.

11. A cooking apparatus having a cooking cavity, comprising:

- first and second heaters installed in upper and lower positions of the cooking cavity, respectively, to heat food;
- a crumb tray inserted between the upper and lower positions and used to contain food in cooking modes using the first and second heaters; and
- a temperature detection unit installed between the first heater and the crumb tray to detect an inside temperature of the cooking cavity;
- wherein the first and second heaters are alternately switched ON and OFF when one of the cooking modes using the first and second heaters is selected through a single cooking mode selection button, a temperature variation rate of the cooking cavity is detected and the temperature variation rate is greater than a preset value.

12. The apparatus as set forth in claim 11, wherein the cooking modes comprise:

one of a baking mode and a broiling mode, the cooking modes being selectable through manipulation of the single cooking mode selection button.

13. A cooking apparatus having a first heater provided in a first position of a cooking cavity to heat food, and a cooking accessory removably insertable in a second position in the cooking cavity to contain the food to be heated using the first heater, comprising:

a temperature detection unit provided in the cooking cavity between the first and second positions to detect the temperature therebetween; and a control unit to determine if the cooking accessory is inserted in the second position in the cooking cavity by a temperature variation rate being greater than a preset value according to the detected temperature from the temperature detection unit.

14. The apparatus as set forth in claim 13, wherein the control unit, in one or more cooking modes, controls the first heater according to whether the cooking accessory is inserted in the second position in the cooking cavity.

15. The apparatus as set forth in claim 13, further comprising:

at least a second heater, wherein an ON/OFF state of the first and at least second heaters is individually controlled according to whether the cooking accessory is inserted in the second position in the cooking cavity.

16. The apparatus as set forth in claim 15, wherein the first and at least second heaters are periodically switched ON and OFF when the cooking accessory is inserted in the second position in the cooking cavity.

17. The apparatus as set forth in claim 15, wherein the first and at least second heaters are alternately switched ON and OFF when the cooking accessory is inserted in the second position in the cooking cavity.

18. The apparatus as set forth in claim 15, wherein the first and second heaters are simultaneously switched ON or OFF when the cooking accessory is removed from the second position in the cooking cavity.

19. The apparatus as set forth in claim 17, wherein the first and second heaters are simultaneously switched ON or OFF when the cooking accessory is removed from the second position in the cooking cavity.

20. The apparatus as set forth in claim 13, wherein the cooking accessory is one of a crumb tray and a wire rack.

21. A cooking apparatus having a first heater provided in a first position of a cooking cavity to heat food, a temperature detection unit provided in the cooking cavity to detect the temperature therein, and a cooking accessory removably insertable in a second position in the cooking cavity to contain the food to be heated using the first heater, comprising:

a single cooking mode selection button to select one of a plurality of cooking modes of using the first heater; and a control unit to determine if the cooking accessory is inserted in the second position in the cooking cavity by a temperature variation rate being greater than a preset value in the one selected cooking mode according to the detected temperature from the temperature detection unit.

22. The apparatus as set forth in claim 21, wherein the plurality of cooking modes comprise:

one of a baking mode and a broiling mode, the cooking modes being selectable through manipulation of the single cooking mode selection button.

23. The apparatus as set forth in claim 21, wherein the control unit, in one or more cooking modes, controls the first heater according to whether the cooking accessory is inserted in the second position in the cooking cavity.

24. The apparatus as set forth in claim 21, further comprising:

at least one second heater, wherein an ON/OFF state of the first heater and at least one second heater is individually controlled according to whether the cooking accessory is inserted in the second position in the cooking cavity.

25. The apparatus as set forth in claim 24, wherein the first heater and the at least second heater are periodically switched ON and OFF when the cooking accessory is inserted in the second position in the cooking cavity.

26. The apparatus as set forth in claim 24, wherein the first heater and the at least second heater are alternately switched ON and OFF when the cooking accessory is inserted in the second position in the cooking cavity and are simultaneously switched ON or OFF when the cooking accessory is removed from the second position in the cooking cavity.

27. A method of controlling a cooking apparatus, the cooking apparatus having a heater installed in a cooking cavity to heat food, and a cooking accessory removably insertable in a second position in the cooking cavity to contain the food to be heated using the first heater, comprising:

operating the first heater when one of cooking modes using the heater is initiated;

obtaining a temperature variation rate by repeatedly detecting a temperature of the cooking cavity; and determining whether the cooking accessory is used based on the temperature variation rate.

28. A method of controlling a cooking apparatus, the cooking apparatus having a first heater provided in a first position of a cooking cavity to heat food, a cooking accessory removably insertable in a second position in the cooking cavity to contain the food to be heated using the first heater, and a temperature detecting unit in a vicinity of the second position in the cooking cavity to detect a temperature thereat, comprising:

operating the first heater;

repeatedly detecting the temperature in the vicinity of the second position in the cooking cavity; and determining whether the cooking accessory is inserted in the second position in the cooking cavity according to a variation in the detected temperature.

29. The method as set forth in claim 28, wherein a second heater is provided in a third position in the cooking cavity, the second position, in which the cooking accessory is insertable, is between the first and third positions, further comprising:

simultaneously operating the first and second heaters when a selected cooking mode using the first and second heaters is initiated.

30. The method as set forth in claim 29, further comprising:

individually controlling the first and second heaters according to whether the cooking accessory is inserted in the second position in the cooking cavity.

31. The method as set forth in claim 29, wherein the individually controlling comprises:

alternately switching ON and OFF the first and second heaters when the cooking accessory is inserted in the second position in the cooking cavity; and simultaneously switching ON or OFF the first and second heaters when the cooking accessory is removed from the second position in the cooking cavity.

32. The method as set forth in claim 28, wherein the determining comprises:

establishing that the cooking accessory is inserted in the second position in the cooking cavity when a temperature variation rate is greater than a preset value.

* * * * *